United States Patent [19]
Shaffer

[11] Patent Number: 5,350,819
[45] Date of Patent: Sep. 27, 1994

[54] CARBOCATIONIC CATALYSTS AND PROCESS FOR USING SAID CATALYSTS

[75] Inventor: Timothy D. Shaffer, Dickinson, Tex.

[73] Assignee: Exxon Chemical Patents Inc., Linden, N.J.

[21] Appl. No.: 44,529

[22] Filed: Apr. 8, 1993

Related U.S. Application Data

[63] Continuation-in-part of Ser. No. 20,850, Feb. 19, 1993.

[51] Int. Cl.$^5$ ............................ C08F 4/52; C08F 2/06
[52] U.S. Cl. ............................ 526/189; 526/185;
526/196; 526/198; 526/204; 526/217; 526/237;
526/348.7; 526/335; 526/346; 525/249;
525/251; 502/152; 502/155; 502/167; 502/202
[58] Field of Search ............ 526/185, 189, 196, 198,
526/204, 217, 237; 502/150, 152, 155, 167, 202,
203; 525/249, 251

[56] References Cited

U.S. PATENT DOCUMENTS

| | | |
|---|---|---|
| 4,276,394 | 6/1981 | Kennedy et al. ............ 525/249 X |
| 4,278,822 | 7/1981 | Ver Strate . |
| 4,910,321 | 3/1990 | Kennedy . |
| 4,929,683 | 5/1990 | Kennedy . |
| 4,946,899 | 8/1990 | Kennedy et al. . |
| 5,169,914 | 12/1992 | Kaszas . |

FOREIGN PATENT DOCUMENTS

| | | |
|---|---|---|
| 1272547 | 8/1990 | Canada . |
| 0341012 | 11/1989 | European Pat. Off. . |
| 90/15081 | 12/1990 | World Int. Prop. O. . |

OTHER PUBLICATIONS

Kennedy et al, "Carbocationic Polymerization in the Presence of Sterically Hindered Bases . . . ", J. Macromol. Sci–Chem., A18(1), pp. 119–128 (1982).

"Living" Cationic Polymerization of Alpha–Methylstyrene, Matyjaszewski, et al.

*Primary Examiner*—Fred Teskin
*Attorney, Agent, or Firm*—Catherine L. Bell

[57] ABSTRACT

A living carbocationic catalyst composition comprising an initiator of a tertiary alkyl halide, a tertiary aralkyl halide or polymeric halide a co-initiator of an alkyl aluminum or alkyl boron, a proton scavenger and a solvent medium with a dielectric constant between 2.5 and 3.25 is used to produce narrow molecular weight distribution polymers particularly isobutylene polymers.

27 Claims, 5 Drawing Sheets

CARBOCATIONIC CATALYSTS AND PROCESS FOR USING SAID CATALYSTS

CROSS REFERENCE TO RELATED APPLICATIONS

This invention is a continuation in part of U.S. Ser. No.08/020,850 filed Feb. 19, 1993.

FIELD OF THE INVENTION

This invention relates to living polymerization of olefins using catalysts comprising alkyl aluminum halides or alkyl boron halides.

BACKGROUND OF THE INVENTION

Living and non-living catalysts have been used to polymerize olefins. In a living polymerization, each catalyst molecule initiates a growing polymer chain that does not undergo chain transfer or termination reactions while monomer is present. By comparing the number of initiator molecules with the number of polymer chains produced in the final polymer, one can determine whether or not a living polymerization has occurred. These two numbers should be equivalent to be a true living polymerization. If there are a substantially greater number of chains, then the polymerization is not living.

Titanium tetrachloride ($TiCl_4$), boron trichloride ($BCl_3$), tin tertachloride($SnCl_4$), iron trichloride ($FeCl_3$), aluminum trichloride ($AlCl_3$) systems and the like have been described in U.S. Pat. Nos. 4,910,321 and 4,929,683, and European patent application 341,012 for use in the living polymerization of olefins. The basic components of these systems include a Lewis acid, a tertiary alkyl initiator molecule containing a halogen, ester, ether, acid or alcohol group and an electron donor molecule such as ethyl acetate. The exact combination of the elements varies with each system. The tertiary alkyl initiators used in these systems are used for living and non-living carbocationic catalysts. The tertiary alkyl initiators are typically represented by the formula:

Wherein $R_1$, $R_2$, and $R_3$ are a variety of alkyl or aromatic groups or combinations thereof, n is the number of initiator molecules and X is the functional group on which the lewis acid affects a change to bring about the carbocationic initiating site. This group is typically a halogen, ester, ether, alcohol or acid group depending on the lewis acid employed. One or two functional groups per initiator tend to lead to linear polymers while three or more tend to lead to star polymers.

As discussed in U.S. Pat. No. 5,169,914, the chosen electron pair donor component of the above systems directly relates to the ability of these catalysts to stabilize the carbocation formed and to generate living conditions. Electron pair donors have been defined as molecules capable of donating electron density to an electron deficient site. These molecules usually contain heteroatoms and heteroatomic functional groups including amides, ester, ethers, sulfoxides and the like. The electron donor number concept has been used to explain the activity of early catalyst systems which employ ether and ester initiators. It was believed that the formation of in situ electron pair donors were responsible for the catalyst characteristics. However, the role of the electron donor is still uncertain and has been challenged. See M Gyor, L. Balogh, H. C. Wang, R. Faust, *Polym. Prepr. Amer. Chem. Soc.* 33 (1), 158(1992).

Catalyst systems based on boron trichloride and titanium tetrachloride using various combinations of the above components typically have similar process characteristics. First, Lewis acid concentrations must exceed the concentration of initiator sites by 16 to 40 times in order to achieve 100 percent conversion in 30 minutes (based upon a degree of polymerization equal to 890) at −75 to −80 degrees C. These catalyst systems are also typically used with solvents. For example, the references above disclose methyl chloride as a preferred solvent and that a mixed solvent may be used to avoid side reactions or to keep the polymer in solution. Further the mixed solvent should provide some degree of polarity to maintain the polymerization rate. However, even in these circumstances, an electron pair donor must be present.

For an industrially applicable process these catalysts and polymerization conditions fall short of commercial usefulness. Improvements in these systems would include elimination of boron and titanium based lewis acids as they present handling and purification problems. Also a reduction in the amount of catalyst used would be preferred and a reduction in polymerization time would be preferred.

SUMMARY OF THE INVENTION

In accordance with this invention, there is provided a living carbocationic polymerization catalyst system comprising an initiator of one of a tertiary alkyl halide, a tertiary aralkyl halide or a tertiary polymeric halide, wherein each alkyl is independently a straight or branched chain alkyl and each aralkyl is substituted or unsubstituted, a co-initiator of an alkyl aluminum or an alkyl boron, a proton scavenger, and a solvent medium having a dielectric constant between about 2.5 and about 3.25. Another aspect of the invention comprises a process of using this catalyst system for the polymerization of olefins and for producing narrow molecular weight distribution polymers. Another aspect of this invention provides methods of making block copolymers and polymers with a comb like structure.

DESCRIPTION OF PREFERRED EMBODIMENTS

This invention relates to a living carbocationic polymerization catalyst composition and process based upon a catalyst composition comprising: (1) an initiator of a tertiary alkyl halide, a tertiary aralkyl halide or a tertiary polymeric halide, wherein each alkyl group is independently a straight or branched chain alkyl, preferably containing 1 to 15 carbon atoms, each aralkyl is substituted or unsubstituted and wherein the polymeric unit is an olefin polymer; (2) a co-initiator of an alkyl aluminum or alkyl boron wherein the alkyl is a straight or branched chain alkyl, preferably of 1 to 15 carbon atoms; (3) a proton scavenger; and (4) a solvent medium with a dielectric constant between about 2.5 and about 3.25. This catalyst system can be used, among other things, for the polymerization of olefins, particularly isobutylene. The system has the benefit of producing polymers with narrow molecular weight distribution, particularly narrow molecular weight distribution polyisobutylene. The system also provides a method to produce block polymers and polymers with a comb like structure.

The initiators include tertiary alkyl or aralkyl halides represented by the formula below:

Wherein X is a halogen, preferably chloride and $R_1$, $R_2$ and $R_3$ are independently any straight or branched chain alkyls, aryls or aralkyls, preferably containing 1 to 15 carbon atoms, more preferably 1 to 8 carbon atoms, even more preferably 1 to 2 carbon atoms. n is the number of initiator sites and is a number greater than or equal to 1, c 1 to 6. The aralkyls may be substituted or unsubstituted. Preferred examples include 2-chloro-2,4,4-trimethyl pentane (TMPCl), 1,3,5 tri (1-chloro-1-methyl ethyl) benzene and 5-tert-butyl-1,3-di(1-chloro-1-methyl ethyl) benzene (TBDCC). Other suitable initiators can be found in U.S. Pat. No. 4,946,899, which is herein incorporated by reference. For the purposes of this invention and any claims thereto, aralkyl is defined to mean a compound containing both aromatic and aliphatic structures.

When the initiator is a tertiary polymeric halide, one of $R_1$, $R_2$ or $R_3$ is an olefin polymer and the remaining R groups are defined as above. Preferred olefin polymers include polyisobutlyene and polypropylene. The polymeric initiator may have halogenated tertiary carbon positioned at the chain end or along or within the backbone of the polymer. When the olefin polymer has multiple halogen atoms at tertiary carbons, either pendant to or within the polymer backbone, the product polymer may have a comb like structure and/or side chain branching depending on the number and placement of the halogen atoms in the olefin polymer. Likewise, the use of a chain end tertiary polymer halide initiator provides a method for producing block copolymers. Monomer added to the polymeric initiator will form a second block. Successive blocks can be formed by sequential monomer addition.

The co-initiator can be any dialkyl aluminum chloride or dialkyl boron chloride. Each alkyl is independently a straight or branched alkyl, preferably containing 1 to 15 carbon atoms, more preferably 1 to 8 carbon atoms even more preferably 1 or 2 carbon atoms. A preferred example of the co-initiator is diethyl aluminum chloride. The alkyl of the co-initiator group should not contain any aromatic groups.

The solvent medium can be a single solvent or a mixture of solvents such that: (1) the polarity has been adjusted to match or resemble that obtained from a solvent mixture of 40 to 80 parts methyl cyclohexane to 60 to 20 parts methylene chloride, by volume; (2) has a calculated dielectric constant of between about 2.5 and about 3.25 units; or (3) has a measured dielectric constant between about 2.5 and about 3.25 plus or minus ten percent error. The dielectric constant is calculated by the following method:

The polarizability (P) of a solvent or mixture of solvents is defined by:

$$P = \frac{E-1}{E+2} \frac{M}{d};$$

where E is the dielectric constant of the solvent or solvent mixture, d is the density of the solvent or solvent mixture and M is the number average molecular weight of the solvent or solvent mixture. E, d and M are all known values that can be obtained from the CRC Handbook of Chemistry and Physics, 71st Edition, CRC Press, Inc., Boca Rotan, Fla. Furthermore, the polarizability of a mixed solvent ($P_{12}$) is defined by:

$$P_{12} = P_1 X_1 P_2 X_2;$$

where $P_1$ and $P_2$ are the polarizabilities of the pure solvents and $X_1$ and $X_2$ are the mole fractions of solvents 1 and 2 in the mixture. Thus, by calculating $P_1$ and $P_2$ from known values and calculating $X_1$ and $X_2$ from the composition of the mixed solvent, $P_{12}$ is determined. The dielectric constant of the mixed solvent ($E_{12}$) is then calculated using d and M of the mixed solvent ($M_{12}$ and $d_{12}$) by solving for $E_{12}$ in the following equation:

$$P_{12} = \frac{E_{12}-1}{E_{12}+2} \frac{M_{12}}{d_{12}};$$

where $$\frac{M_{12}}{d_{12}} = \frac{(M_1 X_1) + (M_2 X_2)}{(d_1 X_1) + (d_2 X_2)};$$

The dielectric constant may also be measured by measuring the capacitance of the solvent or solvent mixture and the capacitance of air with a conductivity bridge with an appropriate conductivity cell and then determining the ratio of the capacitance of the solvent to the capacitance of air. This ratio is the dielectric constant.

Suitable solvents include hydrocarbons, especially hexanes and heptanes, halogenated hydrocarbons, especially chlorinated hydrocarbons and the like. Specific examples include but are not limited to methyl cyclohexane, ethyl cyclohexane, propyl cyclohexane, methyl chloride, methylene chloride, ethyl chloride, propyl chloride, butyl chloride, chloroform and the like.

For the purposes of this invention and the claims thereto a proton scavenger is defined to be a composition capable of reacting with free protons and not producing a new species of catalyst or if it does produce a new species of catalyst, that catalyst is substantially inactive when compared to the catalyst system of this invention. Preferred proton scavengers are 2,6-di-tert-butylpyridine (DTBP), 4-methyl-2,6-di-tert-butyl-pyridine, 1,8-bis(dimethylamino)-naphthalene or diisopropylethylamine used alone or in combination.

The active co-initiator is preferably present in the polymerization feed at a mol ratio of up to about 8 times the number of initiator sites, preferably about 0.001 to about 8 times the number of initiator sites, even more preferably about 0.5 to about 6 times the number of initiator sites.

The proton scavenger, the total amount of initiator sites and the residual water all play a role in influencing the amount of active co-initiator present. Proton scavengers are known to act with the residual water in catalyst systems similar to that described above in a one to one type ratio. In these systems the proton scavenger is usually present at a concentration greater than or equal to the water. In the present invention it has been discovered that proton scavenger present in a concentration greater than the concentration of residual water acts to affect the co-initiators. While not wishing to be bound by any theory, it appears that the proton scavenger acts with the co-initiator to "inactivate" a portion of the co-initiator present. Thus, it appears that active co-initiator is present at a concentration over and above the amount of free proton scavenger left over after acting with the residual water. Therefore, the concentration of both the residual water and the proton scavenger must be taken into account when calculating the number of active co-initiator sites for determining the amount of co-initiator desired. Therefore, in a preferred embodiment, the concentration of the proton scavenger is greater than or equal to the concentration of the residual water, and the concentration of co-initiator is greater than the concentration of proton scavengers not acting upon residual water.

The concentration of active co-initiator is calculated by the following formula: [total amount co-initiator]−([proton scavenger]−[water])=[active co-initiator]. The concentrations of the proton scavenger and the total amount of co-initiator are calculated by dividing the number of moles of scavenger or co-initiator by the volume of liquid present, respectively. The concentration of the water in the system is calculated by solving for I in the following equation $[M]/[I]=DP$, where M equals monomer, I equals initiator and DP equals the degree of polymerization for a water initiated polymerization. Degree of polymerization is calculated by dividing the number average molecular weight of the polymer by the weight average molecular weight of the monomer(s). (For example, 0.268 mol/l of $TiCl_4$ and 2.8 mol/l of isobutylene in a 60/40 mix of methylcyclohexane/methylene chloride at −75 degrees C. for 21 minutes yielding 89% polymer with a Mn of 69,100 and an Mw/Mn of 1.32, means DP=1232 and the water concentration=2.8/DP; therefore $[I]=2.3\times10^{-3}$ mol/l.) This value is calculated for a batch of dried solvent or solvent mixture and then the value is used when that solvent is the reaction media. For the purposes of this invention it is assumed that the concentration of water in a given system of the same solvent batch does not vary in a statistically significant manner. (Even though the exact concentration may vary, the concentration is usually between $10^{-3}$ a to $10^{-4}$ M.)

The polymerization reaction is typically run at or below about −30 degrees C. preferably below about −75 degrees C. Typical monomers which may be polymerized by this system include one or more of: olefins, alpha olefins or disubstituted olefins. Preferred monomers include isobutylene, 2-methyl-butene, 2-methyl-pentene, and the like. The polymerization is typically performed in a solution phase reactor by methods known in the art. The polymerization is typically complete in about 10 minutes, however, may run from less than one minute to about an hour. However, longer polymerization times are still within the scope of this invention.

The polymers produced by this invention have a narrow molecular weight distribution (Mw/Mn), preferably less than about 2.0, even more preferably less than about 1.75. Polyisobutylene and other isobutylene based polymers having a narrow molecular weight distribution are preferred polymers produced by this catalyst system. Furthermore, when tertiary polymeric halide initiators with the tertiary carbon at the chain end or along or with in the polymer backbone are used, block copolymers and/or polymers with one or more side chain branches including comb copolymers are produced, respectively.

EXAMPLES

For the examples of this invention, the method described above was used to calculate the concentration of water in the solvents. For all the examples it is assumed that the water concentration was $2.3\times10^{-3}$ mol/l. Once this concentration was determined above solvents from the same batch of dried solvents were used so as to minimize any variation in water concentration.

Molecular weight (Mw and Mn) were measured by Gel Permeation Chromotography using a Waters 150 gel permeation chromatograph equipped with a differential refractive index (DRI) detector. The numerical analyses were performed using the commercially available standard Gel Permeation package, run on an HP1000 computer.

Example 1

In a nitrogen box with a water content of approximately 5 parts per million, a resin kettle was charged with 0.018 g of (5-tert-butyl-1,3-di(1-chloro-1-methyl ethyl) benzene (TBDCC), 6.6 ml anhydrous methylene chloride, 26.4 ml of anhydrous methyl cyclohexane (20/80 ratio of $MeCl_2:MCH$), and 200 micro liters of DTBP. The solution was cooled to −75 degrees C. whereupon 3 milliliters of isobutylene was added. Once the solution stabilized at this temperature, 0.4 ml of a 2.5 molar solution of diethyl aluminum chloride and methylene chloride were added to begin the polymerization. After 10 minutes the reaction was stopped with the addition of 3 ml of chilled methanol. The polymer product was isolated by pouring the reaction mixture into the methanol by stirring. The polymer product was isolated and dried. 2.13 g of PIB was collected (100% yield) having a $M_n$ of 40,600 and a MWD of 1.47. This procedure was repeated except that time or temperature or monomer amount was varied. The data are presented in Table 1.

TABLE 1

| No | Isobutylene (g) | Temp, C. | Time (min) | Conver, % |
|---|---|---|---|---|
| 1 | 3.55 | −75 | 2 | 16 |

TABLE 1-continued

| No | Isobutylene (g) | Temp, C. | Time (min) | Conver, % |
|---|---|---|---|---|
| 2 | 3.55 | −75 | 10 | 100 |
| 3 | 3.55 | −75 | 20 | 100 |
| 4 | 0.71 | −75 | 10 | 100 |
| 5 | 1.42 | −75 | 10 | 100 |
| 6 | 2.13 | −75 | 10 | 100 |
| 7 | 2.84 | −75 | 10 | 96 |
| 8 | 3.55 | −75 | 10 | 100 |
| 9 | 3.55 | −40 | 30 | 75 |
| 10 | 3.55 | −30 | 30 | 20 |
| 11 | 3.55 | −15 | 30 | 6 |

The co-initiator to initiator site molar concentration ratio was 7 for all the experiments, and the proton scavenger (DTBP) was present at a concentration of $3.0 \times 10^{-2}$ mol/liter. The active co-initiator to initiator sites ratio was 2.0.

Example 2

"All Monomer In" Experiments

Figure 3:
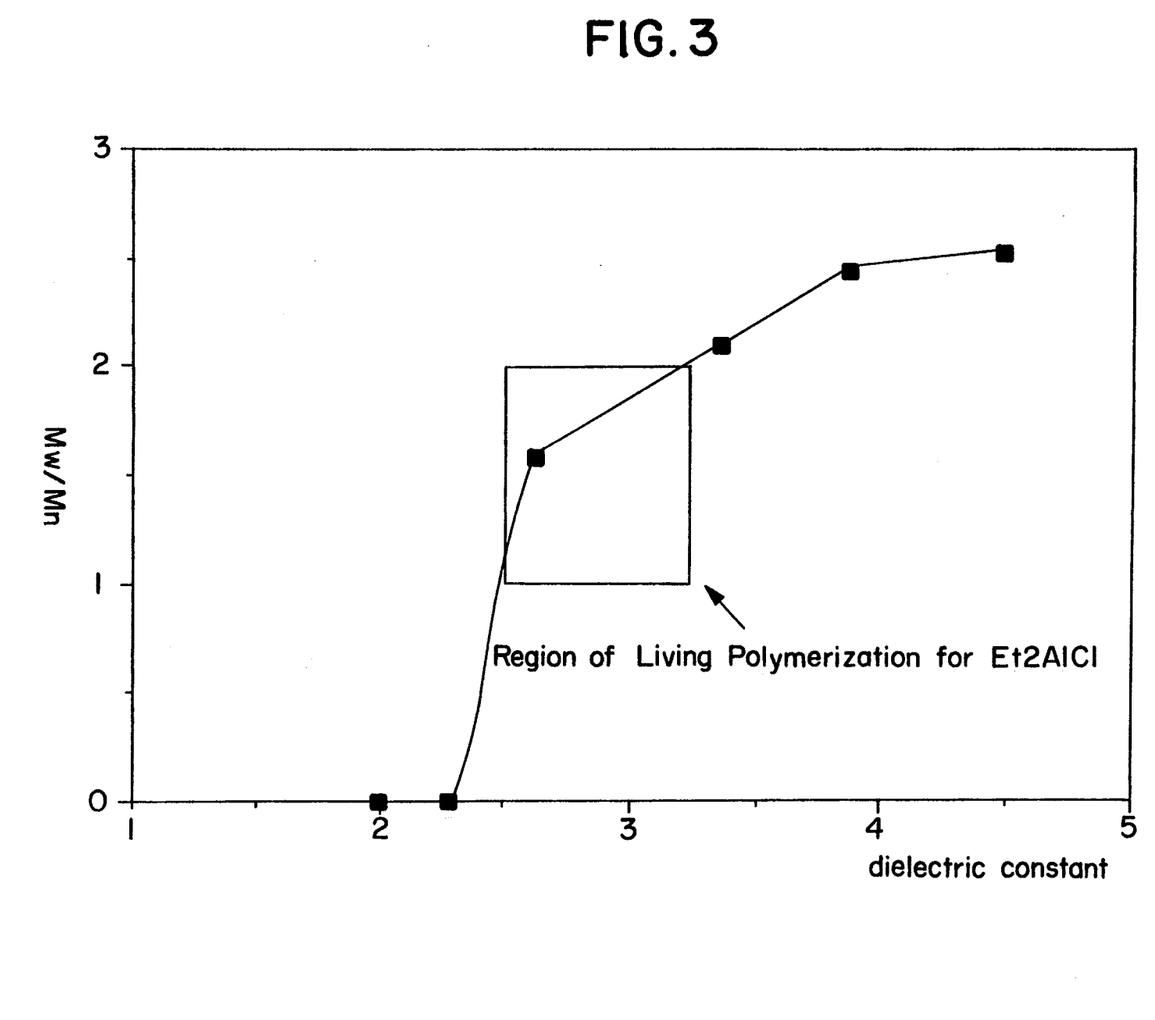
FIG. 3: A plot of MWD (Mw/Mn) versus the calculated dielectric constant of the polymerization solvent.
Figure 4:
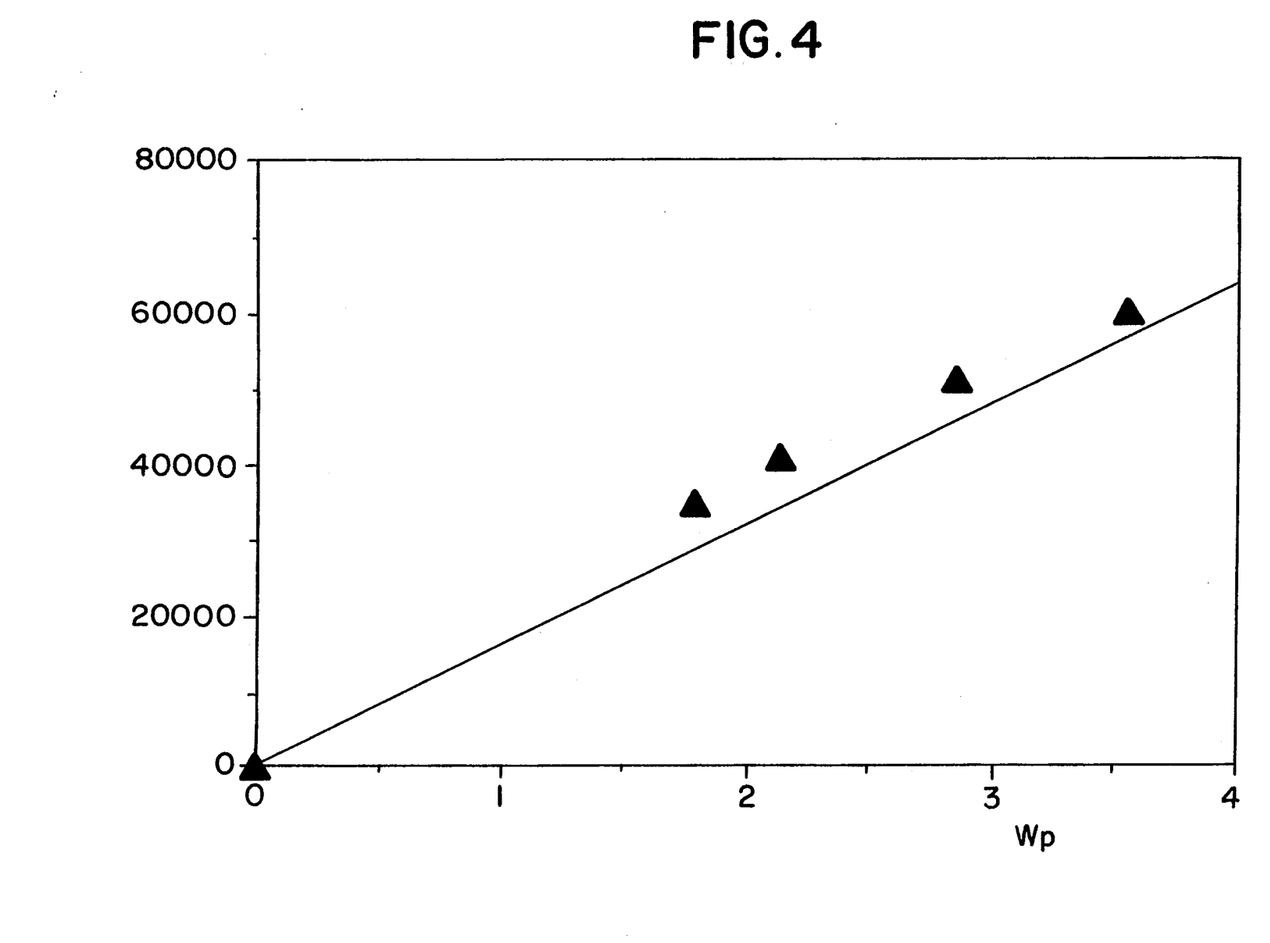
FIG. 4: A plot of $M_n$ vs. $W_p$ for DEAC polymerization at −75 degrees C. in 20/80 v/v $MeCl_2$/MCH and of the calculated values for these reactions under living polymerization conditions.

These reactions were carried out as in Example 1 except that the initial monomer concentration was varied when added to the polymerization vessel. After 10 minutes chilled methanol is added to the polymerization to stop the reaction. Isolated yield of polymers is near 100%. The data are presented in FIGS. 3 and 4 as triangles or squares. Wp is the weight of the polymer prepared, $N_I$=number of initiator sites, Np=number of polymer chains in the product. Since the reactions went to 100% or substantially 100% conversion the weight of the monomer introduced into the reactor is the same as the weight of the polymer product.

TABLE 2

| Exp | Wp | Mn | $N_P/N_I$ |
|---|---|---|---|
| 12 | 1.79 g | 34,800 | 0.820 |
| 13 | 2.13 g | 40,630 | 0.835 |
| 14 | 2.84 g | 51,260 | 0.833 |
| 15 | 3.55 | 60,000 | 0.942 |

These data support the conclusion that isobutylene polymerizations with this catalyst are living systems but the chains have a shorter lifetime than other living carbocationic polymerization catalysts.

Figure 5:
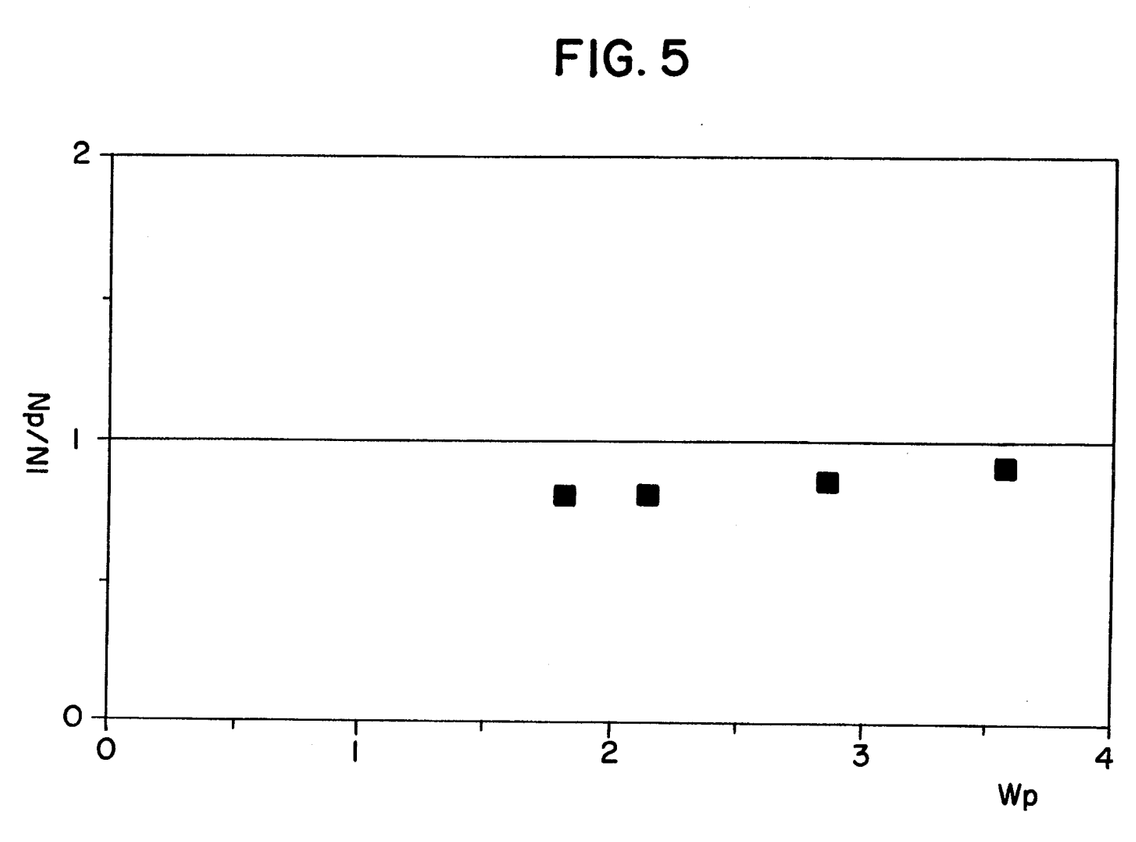
FIG. 5: A plot of $N_p/N_I$ vs. $W_p$ for DEAC polymerization at −75 degrees C. in 20/80 v/v $MeCl_2$/MCH and of the calculated values for these reactions under living polymerization conditions.

The data can be used in two ways to assess the livingness of a polymerization. First a plot of $M_n$ vs $W_p$ (FIG. 4) creates a comparison of experimental $M_n$ with that expected for a truly living system based on starting [M] and [I]. Plotting $N_p/N_I$ ($N_p$: number of polymer molecules prepared; $N_I$: number of initiator molecules) v. $W_p$ (FIG. 5) addressed the total number of polymer chains created in the system compared with that intended from the amount of initiator added to the system. Both Figures show that actual data follows closely the theoretical line calculated for a living system. Both Figures indicate the system is living.

Example 3

The procedure used in Example 1 was followed, except that the solvent ratio was 40/60, to conduct a diethyl aluminum chloride polymerization of isobutylene at −75 degrees C.

TABLE 3

| | Proton Scavenger | ACI/IS | Yield % |
|---|---|---|---|
| 16 | no | 8 | 0 |
| 17 | yes | 2 | 96 |

TABLE 3-continued

| | Proton Scavenger | ACI/IS | Yield % |
|---|---|---|---|
| 18 | yes | 1.5 | 82 |
| 19 | yes | 1 | 93 |
| 20 | yes | 0.5 | 84 |
| 21 | yes | 0 | 0 |

Proton scavenger=DTBP, [DTBP]=$3.0 \times 10^{-2}$ mol/liter ACI/IS: ratio of moles active co-initiator to number of initiator sites, assuming [water]=$2.3 \times 10^{-3}$ mol/l.

The data show that the proton scavenger has a beneficial effect on the yield. The data for Example 21 show 0% yield because the proton trap is present at a concentration equal to or greater than the co-initiator, thus there was no "active" co-initiator to polymerize the monomer.

Example 4

Figure 1:
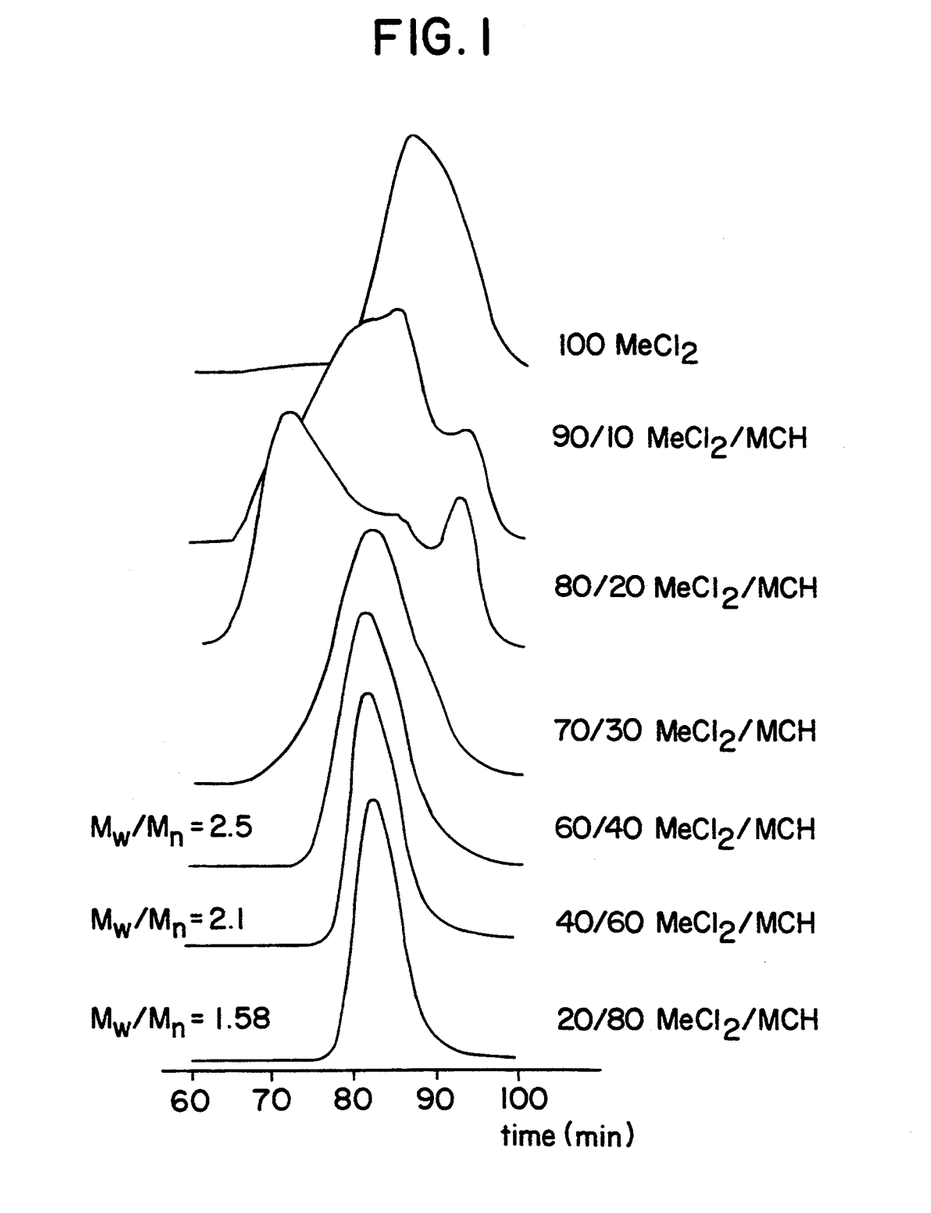
FIG. 1: Gel Permeation Chromatography traces of polymers prepared in differing solvent compositions.
Figure 2:
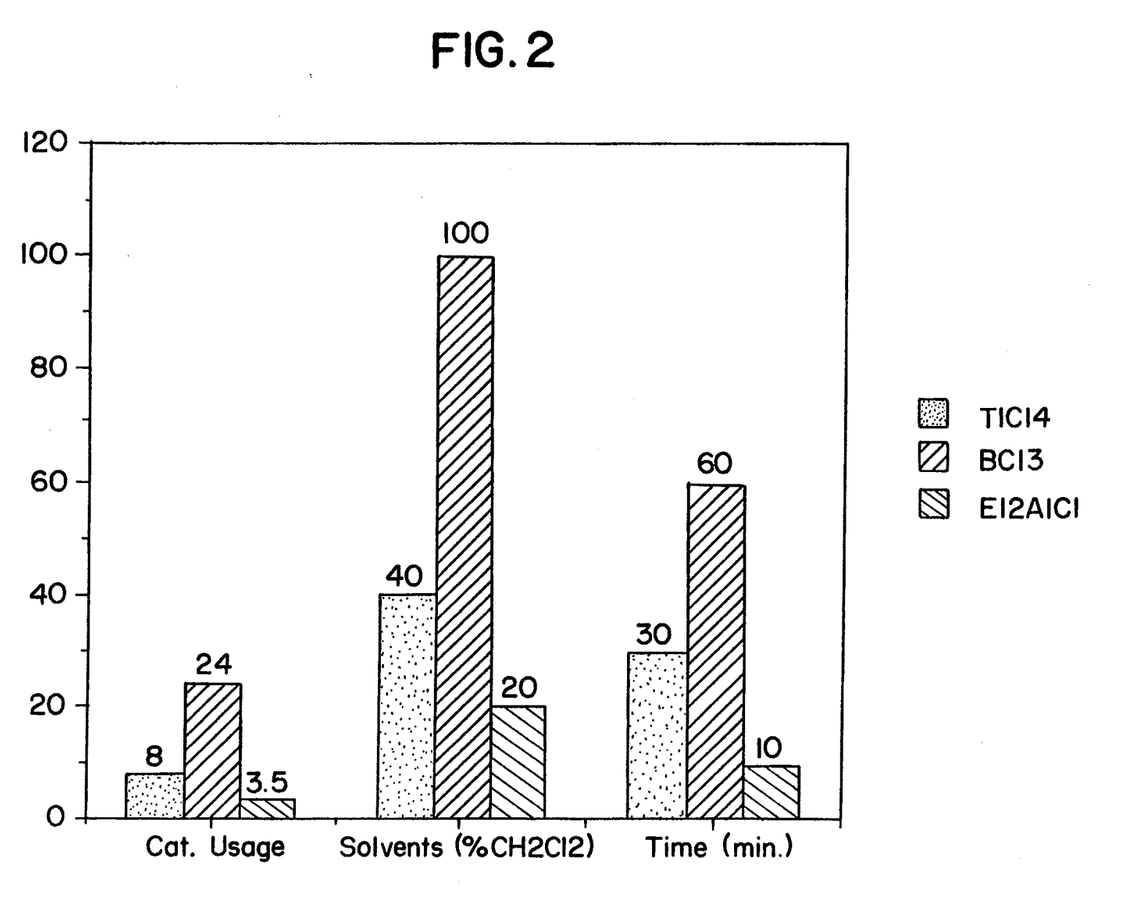
FIG. 2: A comparison of boron and titanium based catalysts with diethylaluminum chloride living catalyst.

The polymerization conducted in Example 2 was repeated however, the solvent ratios were varied. The results are presented in Table 4 and FIG. 1.

TABLE 4

| Exp | MeCl$_2$/MCH | MWD |
|---|---|---|
| 22 | 0/100 | — |
| 23 | 10/90 | — |
| 24 | 20/80 | 1.58 |
| 25 | 40/60 | 2.1 |
| 26 | 60/40 | 2.5 |
| 27 | 70/30 | 4.41 |
| 28 | 80/20 | 15.14 |
| 29 | 90/10 | 9.40 |
| 30 | 100/0 | 4.46 |

These data show that when the composition of the solvent was changed from 100% methylene chloride to 20/80 methylene chloride/methyl cyclohexane improved molecular weight distribution was obtained. The narrowing effect of the non-polar methyl cyclohexane is evident at 60/40 methyl dichloride and methyl cyclyhexane mixtures and at 20/80 methylene chloride and methyl cyclohexane mixtures. No polymerization occurred at 10/90 methylene chloride and methyl cyclohexane ratios or in 100% methyl cyclohexane.

As is apparent from the foregoing general description and the specific embodiments, while forms of the invention have been illustrated and described, various modifications can be made without departing from the spirit and scope of the invention. Accordingly, it is not intended that the invention be limited thereby.

I claim:

1. A catalyst composition comprising:
   an initiator of a tertiary alkyl halide or a tertiary aralkyl halide;
   a co-initiator which is an alkyl aluminum or an alkyl boron compound;
   a proton scavenger; and
   a solvent medium having a dielectric constant between about 2.5 and about 3.25.

2. The catalyst composition of claim 1 wherein the co-initiator is a di-alkyl aluminum halide wherein each alkyl is independently a straight or branched chain alkyl containing 1 to 15 carbon atoms.

3. The catalyst composition of claim 2, wherein the alkyl of the co-initiator has 1 to 8 carbon atoms.

4. The catalyst composition of claim 1 wherein the co-initiator is diethyl aluminum chloride.

5. The catalyst composition of claim 1 wherein each alkyl or aralkyl group of the initiator has 1 to 8 carbon atoms.

6. The catalyst composition of claim 5 wherein each alkyl or aralkyl group has 1 or 2 carbon atoms.

7. The catalyst composition of claim 1 wherein the initiator is represented by the formula:

wherein $R_1$, $R_2$ and $R_3$ are independently a $C_1$ to $C_{15}$ straight or branched chain alkyl, aryl or aralkyl group, X is a halogen and n is a number greater than or equal to 1.

8. The catalyst composition of claim 1 wherein the proton scavenger is one of 2,6-di-tert-butylpyridiene, 4-methyl-2,6-di-tert-butyl-pyridine, 1,8-bis(dimethylamino)-naphthalene, diisopropylethylamine or mixtures thereof.

9. The catalyst composition of claim 1 wherein the catalyst is utilized at a temperature less than about $-30$ degrees C.

10. The catalyst composition of claim 1 wherein the catalyst is utilized at a temperature less than about $-70$ degrees C.

11. The catalyst composition of claim 1, wherein the dielectric constant is calculated.

12. The catalyst composition of claim 1 wherein the dielectric constant is measured.

13. The catalyst composition of claim 1 wherein the ratio of the number of moles of active co-initiator to the number of initiator sites is up to about 8:1.

14. The catalyst composition of claim 1 wherein the ratio of number of moles of active co-initiator to the number of initiator sites is from about 0.001:1 to about 8:1.

15. A process for producing a polymer comprising contacting under polymerization conditions one or more olefinic, alpha olefinic, disubstituted olefinic or styrenic monomers with a catalyst composition comprising:

an initiator of a tertiary alkyl halide or a tertiary aralkyl halide;
a co-initiator of an alkyl aluminum or alkyl boron, wherein each alkyl is independently a straight or branched chain $C_1$ to $C_{15}$ alkyl;
a proton scavenger; and
a solvent medium with a dielectric constant between 2.5 and 3.25.

16. A catalyst composition comprising:
an initiator of tertiary alkyl halide or tertiary aralkyl halide;
a co-initiator of a dialkyl aluminum chloride or dialkyl boron chloride; and
a proton scavenger;
in a solvent of 60 to 20 parts by volume methylene chloride and 40 to 80 parts by volume methyl cyclohexane.

17. A process for producing a polymer comprising contacting under polymerization conditions one or more olefinic, alpha olefinic, disubstituted olefinic or styrenic monomers with a catalyst composition comprising:

an initiator of a tertiary alkyl halide, or a tertiary aralkyl halide;
a coinitiator of an alkyl aluminum or alkyl boron, wherein each alkyl is independently a straight or branched chain $C_1$ to $C_{15}$ alkyl;
a proton scavenger; and
a solvent medium with a dielectric constant between 2.5 and 3.25.

18. The process of claim 17 wherein the polymerization is conducted at a temperature at or below about $-30$ degrees C.

19. The process of claim 17 wherein the polymerization is conducted at a temperature at or below about $-70$ degrees C.

20. The process of claim 17 wherein the ratio of the number of moles of active co-initiator to the number of initiator sites is between about 0.001:1 to about 8:1.

21. The process of claim 17 wherein the initiator is present in a concentration greater than the concentration of the proton scavenger.

22. The process of claim 17 wherein the co-initiator is a di-alkyl aluminum halide wherein each alkyl group is independently a straight or branched chain alkyl having 1–15 carbons.

23. The process of claim 17 wherein the co-initiator is diethyl aluminum chloride, the initiator is a tertiary alkyl halide or tertiary aralkyl halide wherein each alkyl or aralkyl independently has 1 to 8 carbon atoms and the proton scavenger is 2,6-di-tert-butyl pyridine.

24. The process of claim 17 wherein the initiator is represented by the formula:

wherein $R_1$, $R_2$ and $R_3$ are independently $C_1$ to $C_{15}$ alkyl straight or branched chain alkyls, aryls or aralkyls, X is a halogen, n a number from 1 to 6.

25. The process of claim 17 wherein the monomer is isobutylene.

26. A process for the living polymerization of one or more olefin, alpha-olefin or di-substituted olefin monomers comprising contacting in a solvent medium of 60 to 20 methylene chloride units and 40 to 80 methyl cyclohexane units by volume, for a total of about 100 parts under polymerization conditions said monomers with an:

initiator of a tertiary alkyl halide or tertiary aralkyl halide;
co-initiator of di-alkyl aluminum chloride or di-alkyl boron chloride and a proton scavenger.

27. A process for producing polymers with long chain branching comprising contacting monomers selected from the group consisting of olefins, alpha-olefins, styrenes, di-substituted olefins and mixtures thereof under polymerization conditions with:

an initiator of a multiply-halogenated tertiary polymeric halide;
a co-initiator of an alkyl aluminum halide or an alkyl boron halide;
a proton scavenger; and
a solvent medium having a dielectric constant between about 2.5 and about 3.25;
provided that the initiator has at least one tertiary halide in or along the polymer backbone.

* * * * *